July 22, 1958  C. W. MUNDAY  2,844,728
RADIATION DETECTOR
Filed Jan. 27, 1954
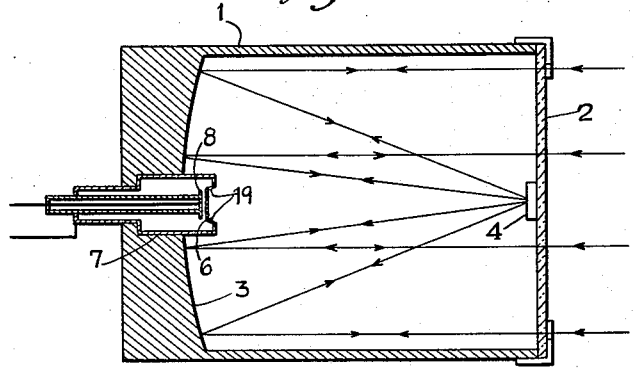
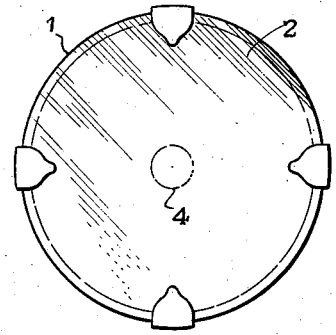
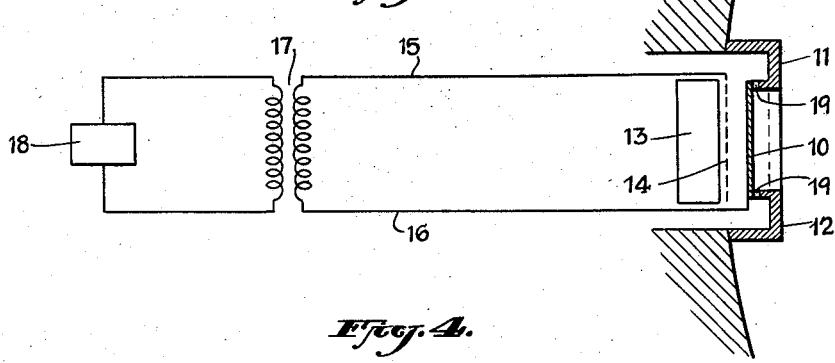
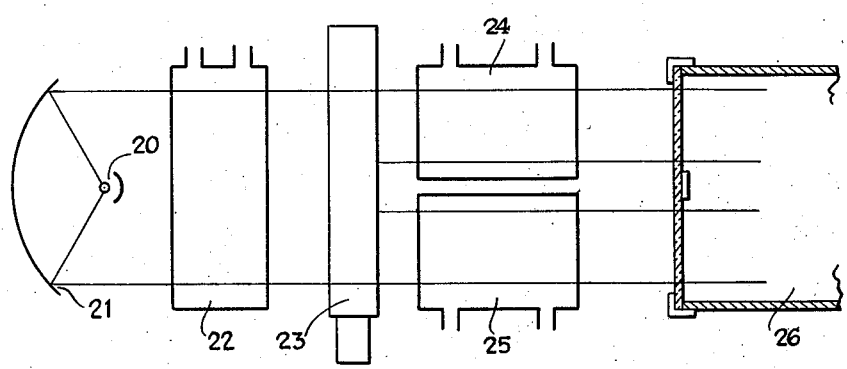
INVENTOR.
CHARLES WALTER MUNDAY.
BY
ATTORNEYS.

2,844,728

RADIATION DETECTOR

Charles Walter Munday, London, England, assignor to The Distillers Company Limited, Edinburgh, Scotland, a British company Application January 27, 1954, Serial No. 406,476

Claims priority, application Great Britain January 30, 1953

7 Claims. (Cl. 250—43.5)

The present invention relates to an improved radiation detector wherein the detector responds to variation in the intensity of two beams received by said detector.

Radiation detectors at present employed are not satisfactory for the measurement of small energy differences in two beams of radiation. Thus, in infra-red double beam radiation gas analysers a major problem is that of measuring small energy differences between the two beams. The ultimate limit of the accurate determination of gas concentrations in this type of apparatus is set by the smallest percentage of unbalance in the beams which can be detected. Thus, for example, an instrument of beam balance stability (i. e. the smallest energy difference that can be measured by the detector employed) of 0.1% will be ten times as sensitive for a given analytical problem as an instrument of beam balance stability of 1%. Where it is desired to employ an infra-red double beam radiation gas analyser for the analysis of mixed hydrocarbons a beam balance stability of 0.01% is desirable.

It is an object of the present invention to provide a radiation detector capable of measuring small energy differences in two beams of radiation.

It has been found that the variation in intensity of beams of radiation can be satisfactorily measured by the determination of temperature differences in said detector by means of the movement of a metal diaphragm contained in said detector.

It is also an object of the present invention to obtain efficient absorption of energy by ensuring that the beams of radiation have a maximum path length in the minimum space within the selective detector.

The invention accordingly comprises the novel apparatus and combinations thereof, specific embodiments of which are described herein by way of example only and in accordance with the manner in which I now prefer to practice the invention.

Accordingly the present invention is for a radiation detector which comprises a chamber, which is provided with one wall which is transparent to the radiation, a facing wall having a reflecting concave surface, a flexible diaphragm mounted in said reflecting wall and means for the measurement of the movement of said diaphragm in response to pressure variations in said detector. The transparent wall of the detector is preferably provided with a reflector in a position corresponding to the focal point of the reflecting concave surface. It is preferred that the diaphragm is mounted at the centre of pressure of the detector.

The means for the measurement of the movement of said diaphragm may comprise any one of the various means known in the art. One such means comprises an optical system wherein a light spot is reflected by said diaphragm and the movement of the reflected spot is either observed visually or electrically. Another such means comprises an electrical system wherein an electrically charged plate is mounted behind said diaphragm, so that said plate and diaphragm act as a condenser, the movement of said diaphragm towards or away from said plate causing a measurable variation in the capacity thereof.

An alternative electrical system comprises employing an electret mounted behind said diaphragm in order to measure the movement of said diaphragm. From such a system a current output is obtained directly by the movement of the diaphragm which can be amplified by suitable transformers and/or valves or standard magnetic amplifiers. Such amplifier circuits are inherently simpler than those normally used for measuring very small capacity charges.

The chamber forming the radiation detector is suitably massive in order to give thermal stability. It is preferably constructed of a metal of good thermal ground such as iron, steel, brass and other metals of good thermal conductivity. The concave reflecting surface of the detector may if desired be a separable part which is inserted into the chamber, but is preferably the wall of the chamber suitably ground and polished. The transparent wall or window of the chamber may be constructed of glass, rock salt, quartz, fluorite, silver chloride and like materials, which are chosen according to the optical band which it is desired to admit to the chamber.

The diaphragm may be constructed of any material suitable to form a thin diaphragm such as metals, plastic materials or thin plastic membranes bearing a metal film. The diaphragm is suitably made by evaporating a metal film, such as aluminium, gold, platinum and the like, on to a thin plastic base and either using the resulting metal-plastic membrane or dissolving off the plastic film and employing the resulting thin metal membrane.

In order to protect the diaphragm, and also to avoid movement of the diaphragm which is caused by temperature changes in the whole volume of the detector, as a result for example of changes in room temperature, it is desirable to provide a leak of appropriate size between the chamber and the rear of the flexible diaphragm. This leak acts in effect as a safety valve, but of course must not be such as to effect the response of the apparatus. In other words, the time constant of the leak must be large in comparison with the radiation modulation frequency.

The detector is of use in radiation analysers. Such radiation analysers comprise in essence a source of radiation, analysis cells and a radiation detector according to the present invention. The detector according to the present invention is of particular application for use in double beam radiation analysers. Such analysers are described for example in J. Optical Society of America, February 1950, pages 112–118. The detector may very suitably be used in infra-red radiation analysers which comprise a source of radiation, an analysis absorption cell, a filter cell if desired, a radiation interrupter, a twin cell unit and a radiation detector according to the present invention, wherein the radiation interrupter divides and interrupts the radiation, half of the radiation passing through one cell of said twin unit and half of the radiation passing through the other cell of said twin unit.

A particular form of an infra-red gas analyser is described in our copending U. S. appln. No. 177,890, dated August 5, 1950, now Patent No. 2,741,703. This radiation gas analyser comprises a source of radiation, an analysis gas absorption cell, a filter unit consisting of a support containing longitudinally therein at least two filter cells, a second filter unit containing an equal number of test gas absorption/standard gas absorption double cells which each consist of an absorption cell arranged in two gas tight compartments, a radiation detector, means for dividing the radiation into two equal discrete beams of radiation, means for passing one beam of radiation through said analysis gas absorption cell, a filter cell and one compartment of a test gas absorption/standard gas absorption double cell, means for passing the other beam of radiation through said analysis gas absorption cell, said filter cell and the other compartment of said test gas absorption/standard gas absorption double cell, means for the alternate interruption of the discrete beams of radiation, means for the concentration of said beams of radiation on to a single radiation detector, and means for the discontinuous rotation of said filter units to rotate each filter cell and each test gas absorption/standard gas absorption double cell into position in said beams of radiation.

The single radiation detector employed in such a radiation analyser is advantageously the radiation detector of the present invention. The difference in energy of the two beams causes differential heating of said detector, thus causing variations in the pressure in said detector, with consequent movement of the diaphragm, this movement being a measure of the gas concentrations in the analysis system.

The attached drawings are given solely by way of illustration.

Figure 1 is a diagrammatic sectional view of a radiation detector according to the present invention.

Figure 2 is a front elevational view of said radiation detector.

Figure 3 is a circuit diagram of a radiation detector employing an electret.

Figure 4 is a diagrammatic layout of a radiation analyser.

The radiation detector comprises the cylindrical vessel 1 provided with glass window 2 and concave reflecting wall 3. The focal point of the concave reflecting wall 3 corresponds to the reflector 4 disposed at the centre of the window 2. At the centre of the concave reflecting wall is mounted the thin flexible diaphragm 6 on the mount 7 and associated with the rigidly mounted plate 8, which is insulated from the diaphragm 6 and diaphragm mount 7. A small leak 19, shown diagrammatically is provided from the chamber to the rear of the diaphragm. The diaphragm 6 is preferably a thin aluminium flexible diaphragm.

In operation collimated radiation enters the cell by the window 2 and is focussed by the mirror 3 on to the reflector 4, where the radiation is reflected on to the mirror 3 and thence to the window 2. The cell is filled with the absorbing gas which is heated by the passage therethrough of the radiation. This results in an increase in pressure in the cell which pushes the thin flexible metallic diaphragm 6 nearer the plate 8, causing a variation in the capacitance therebetween. For modulated radiation the gas pressure changes can be translated into a modulated capacitance which may be measured by means of an electrical oscillator, whose frequency is proportional to the value of the capacitance between the diaphragm 6 and the plate 8, feeding a frequency discriminator. Since the order of change of capacitance is small, special precautions have to be observed to keep the frequency constant to within the desired minimum detectable change limit.

In Figure 3 is shown in diagrammatic form an electret associated with the diaphragm of a radiation detector (not shown) as in Figure 1. The metal diaphragm 10 is mounted on the supports 11 and 12 forming part of the wall of the radiation detector. A small leak 19, shown diagrammatically is provided from the chamber to the rear of the diaphragm. Mounted immediately behind the diaphragm 10 is the electret on the surface of which adjacent to said diaphragm is deposited a metallic grid 14. The grid 14 and the metal diaphragm 10 are connected by the electric connections 15 and 16 respectively to the transformer 17, which is connected to the amplifier 18. In operation movement of the diaphragm 10 induces a displacement current due to the permanent electric field of the electret and a current is generated in the transformer proportional to the magnitude of the displacement of the diaphragm. This current may be amplified and measured in any suitable way.

In Figure 4 is shown an infra-red analyser wherein radiation from source 20 is reflected by concave mirror 21 to give a beam of radiation. This beam of radiation passes into the analysis gas absorption cell 22 containing the gas mixture to be analysed. If desired a filter cell may also be provided. The beam of radiation is then divided into two equal alternately interrupted beams of radiation by the rotating interrupter 23, and one of said beams passes through the half cell 24 and thence to the detector 26, which is that shown in Figure 1, whilst the other of said beams passes through the half cell 25 and then also to the detector 26. In operation of this form of infra-red analyser, the detector responds to the difference in the energy levels of the two beams; where the energy of the two beams is the same the temperature of the detector will be constant and there will therefore be no movement of the diaphragm therein; where the energy level of the two beams is different the temperature of the detector will vary at a frequency corresponding to the rate of interruption of the two beams. The time constant of the leak at the diaphragm must be large in comparison with this rate of interruption. Measurement of the capacitance between the diaphragm 6 and the plate 8 of the detector is effected in standard ways.

I claim:

1. An infra-red radiation detector which comprises a chamber, which is provided with one wall which is transparent to the radiation, and a facing wall one portion of which has a reflecting concave surface and another portion of which is formed by a flexible diaphragm mounted contiguous to said reflecting surface and means for the measurement of the movement of said flexible diaphragm in response to pressure variation in said detector.

2. An infra-red radiation detector which comprises a chamber, which is provided with one wall which is transparent to the radiation, and a facing wall having a reflecting concave surface, a flexible metal diaphragm mounted on said facing wall substantially in the center of said facing wall and forming part thereof, and means for the measurement of the movement of said flexible metal diaphragm in response to pressure variation in said detector.

3. An infra-red radiation detector which comprises a chamber, which is provided with one wall which is transparent to the radiation, and a facing wall having a reflecting concave surface, a reflector positioned on the transparent wall in a position corresponding to the focal point of the facing reflecting concave surface, a flexible metal diaphragm mounted on said reflecting wall and means for the measurement of the movement of said flexible metal diaphragm in response to pressure variation in said detector.

4. An infra-red radiation detector which comprises a chamber, which is provided with one wall which is transparent to the radiation, and a facing wall having a reflecting concave surface, a reflector positioned on the transparent wall in a position corresponding to the focal point of the facing reflecting concave surface, a flexible metal diaphragm mounted on said reflecting wall and an electrical means for the measurement of the movement of said diaphragm comprising an electrically charged plate and potential measuring and amplifying means wherein the electrically charged plate is mounted behind said diaphragm so that said diaphragm and said plate act as a condenser, the movement of said diaphragm towards or away from said plate causing a measurable variation in the potential thereof.

5. An infra-red radiation detector which comprises a chamber, which is provided with one wall which is transparent to the radiation, and a facing wall having a reflecting concave surface, a reflector positioned on the transparent wall in a position corresponding to the focal point of the facing reflecting concave surface, a flexible metal diaphragm mounted on said reflecting wall and an electrical means for the measurement of the movement of said diaphragm comprising an electret and current output amplifying and measuring means wherein the electret is mounted behind said diaphragm so that a current output which can be amplified is obtained directly by the movement of the diaphragm.

6. An infra-red radiation detector comprising a chamber having one wall at least a portion of which is transparent to the radiation and a facing wall at least a portion of the face of which has a reflecting surface, a flexible diaphragm mounted within one face thereof bounding the space intermediate said facing wall and said one wall, and means controlled by said diaphragm for indicating the movement of said diaphragm in response to pressure variation in said chamber.

7. An infra-red radiation detector comprising a chamber having one wall at least a portion of which is transparent to the radiation and a facing wall spaced from said one wall by a predetermined distance and at least a portion of the face of which has a reflecting surface, a flexible diaphragm mounted with one face thereof exposed to the space between said facing wall and said one wall, said face of said diaphragm being spaced from said one wall a distance substantially no greater than said predetermined distance, and means controlled by said diaphragm for indicating movement thereof in response to pressure variation in said chamber.

References Cited in the file of this patent

UNITED STATES PATENTS

| | | |
|---|---|---|
| 2,570,064 | Meinert | Oct. 2, 1951 |
| 2,573,870 | Pfund | Nov. 6, 1951 |